United States Patent
Simpson et al.

(10) Patent No.: US 6,611,880 B1
(45) Date of Patent: Aug. 26, 2003

(54) SYSTEM FOR SELECTING A DEVICE OVER A NETWORK FOR A COMPUTER TO USE

(75) Inventors: Shell S. Simpson, Boise, ID (US); Matthew P. Howell, Boise, ID (US); Kevin L. Porter, Nevada City, CA (US)

(73) Assignee: Hewlett-Packard Development Co., L.P., Houston, TX (US)

( * ) Notice: Subject to any disclaimer, the term of this patent is extended or adjusted under 35 U.S.C. 154(b) by 0 days.

(21) Appl. No.: 09/494,106

(22) Filed: Jan. 28, 2000

(51) Int. Cl.[7] .................................................. G06F 11/00
(52) U.S. Cl. ............................... 710/18; 710/8; 710/15; 710/16; 710/17; 710/73; 358/1.15; 358/1.16; 358/1.17; 358/1.18
(58) Field of Search ................................ 710/1, 17, 18, 710/2, 3, 4, 5, 8–16, 73; 358/1.15–1.18

(56) References Cited

U.S. PATENT DOCUMENTS 5,960,167 A * 9/1999 Roberts et al. ............ 358/1.15
6,189,050 B1 * 2/2001 Sakarda ...................... 710/18
6,348,971 B2 * 2/2002 Owa et al. ................. 358/1.15

FOREIGN PATENT DOCUMENTS

JP          61013330 A   *  1/1986   ............. G06F/3/12

* cited by examiner

*Primary Examiner*—Jeffrey Gaffin
*Assistant Examiner*—Mike Nguyen
(74) *Attorney, Agent, or Firm*—Matthew L. Wade

(57) ABSTRACT

A computer automatically selects a device, such as a printer, over a network for the computer to use without a user having to provide the network address of the device. The computer identifies a group of devices connected to a network that meet certain pre-determined criteria. The computer then selects the device from this group that has the lowest uptime. This device is assumed to be the device the user wishes to configure their computer to use. After the device is selected, the computer then can operate to configure itself to use the device.

17 Claims, 7 Drawing Sheets

SYSTEM FOR SELECTING A DEVICE OVER A NETWORK FOR A COMPUTER TO USE

BACKGROUND OF THE INVENTION

A networking system often includes multiple computing devices all connected together via a network. It is often the case that in such a system, a user of one computer wishes to configure their computer to use another computing device over the network.

For ease of discussion, the phrase "target device" refers to the specific device the user presently wishes to configure their computer to use. The target device may also be referred to more specifically. For example, if the target device happens to be a printer it may also be referred to as the "target printer".

Unfortunately, the configuration of a computer to use a particular target device can often be a difficult and frustrating task for the user to perform. One reason for this is that the user is often required to know the network address of the target device in order to complete the configuration task. This information is not always readily available and can be difficult for the user to obtain.

For example, consider a networking system that includes a personal computer and multiple printers all connected via a network. The user of the personal computer wishes to configure their computer to print to a specific target printer over the network. Typically, in order to complete the configuration of the computer, the user must provide the computer with the network address of the target printer. The address provides the computer with the information required to transmit print jobs over the network directly to the target printer.

Unfortunately, obtaining the address of a networked device such as a printer can be difficult. The user may simply not know how to acquire this information. In some cases, the user may involve a network support person to obtain the network address information. This solution can result in increased support costs and consume valuable user time. Alternatively, the user may cause the target printer to print a test page with the network address printed thereon. This typically involves the user having to interface with the printer controls which are often unfamiliar to the user. As a result, valuable user time can be consumed in performing this task.

Accordingly, what is needed is a way to configure a computer to use a target device over a network without the user having to know the network address of that device.

SUMMARY OF THE INVENTION

In one embodiment of the invention, a computer is provided that is configurable to use a target device without the user having to provide the computer with the network address of the target device. As will be shown below, this can serve to significantly simplify the configuration task for the user.

The present invention may be implemented as a computerized method for selecting a device from a plurality of devices for a computer to use. These devices may be printers connected to a network. The method includes selecting a device that has the lowest uptime from the plurality of devices. In one embodiment, the device is then configured to use the selected device. In another embodiment, the method further comprises the steps of requesting confirmation that the computer should be configured to use the selected device; and if the confirmation is received, then configuring the computer to use the selected device.

The present invention may also be implemented as a computer that includes a means for identifying a group of devices coupled to a network and a means for selecting a device from the group of devices having the lowest uptime. The devices may be printers connected to the network. In one embodiment, the computer may also include a means for configuring the computer to use the device in response to the device being selected. In another embodiment the computer further includes a means for requesting confirmation from a user that the computer should be configured to use the selected device and a means for receiving the confirmation and responding thereto by configuring the computer to use the selected device.

The present invention may also be implemented as a program storage medium readable by a computer, tangibly embodying a program of instruction executable by the computer to perform method steps for selecting a device coupled to a network, the method steps including identifying a plurality of devices coupled to the network that meet at least one pre-determined criterion and selecting a device from the plurality of devices having the lowest uptime. In one embodiment, the method steps further include the step of configuring the computer to use the selected device. In another embodiment the method steps further include the step of requesting confirmation that the computer should be configured to use the selected device and upon receiving the confirmation, responding thereto by configuring the computer to use the selected device. In yet another embodiment, the pre-determined criteria include the criterion that the device is a printer.

DETAILED DESCRIPTION OF THE INVENTION

In a preferred embodiment of the invention, a computer is provided that is configurable to use a target device without the user having to provide the computer with the network address of the target device. As will be shown below, this can serve to significantly simplify the configuration task for the user.

Figure 1:
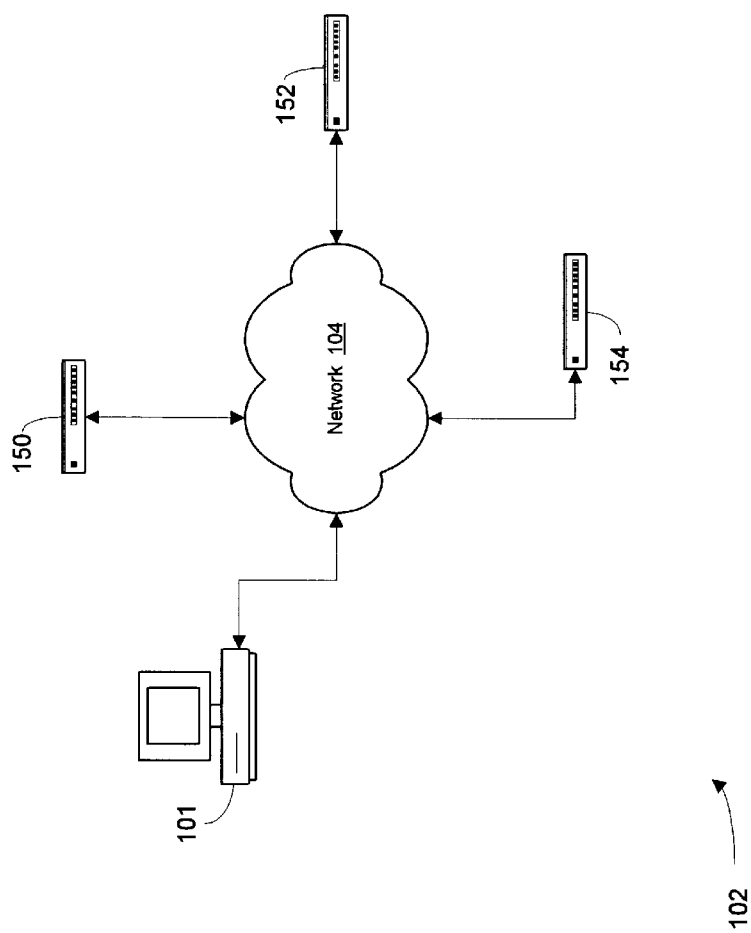
FIG. 1 is a block diagram of a networking system showing a computer that is in accordance with the invention.

To illustrate one embodiment of the invention, FIG. 1 shows a block diagram of a network system 102. The network system 102 includes a personal computer 101, a first device 150, a second device 152 and a third device 154 all coupled to a network 104. It is assumed, for purposes of this description, that a user wishes to configure the computer 101 to use a target device over the network 104.

Figure 2:
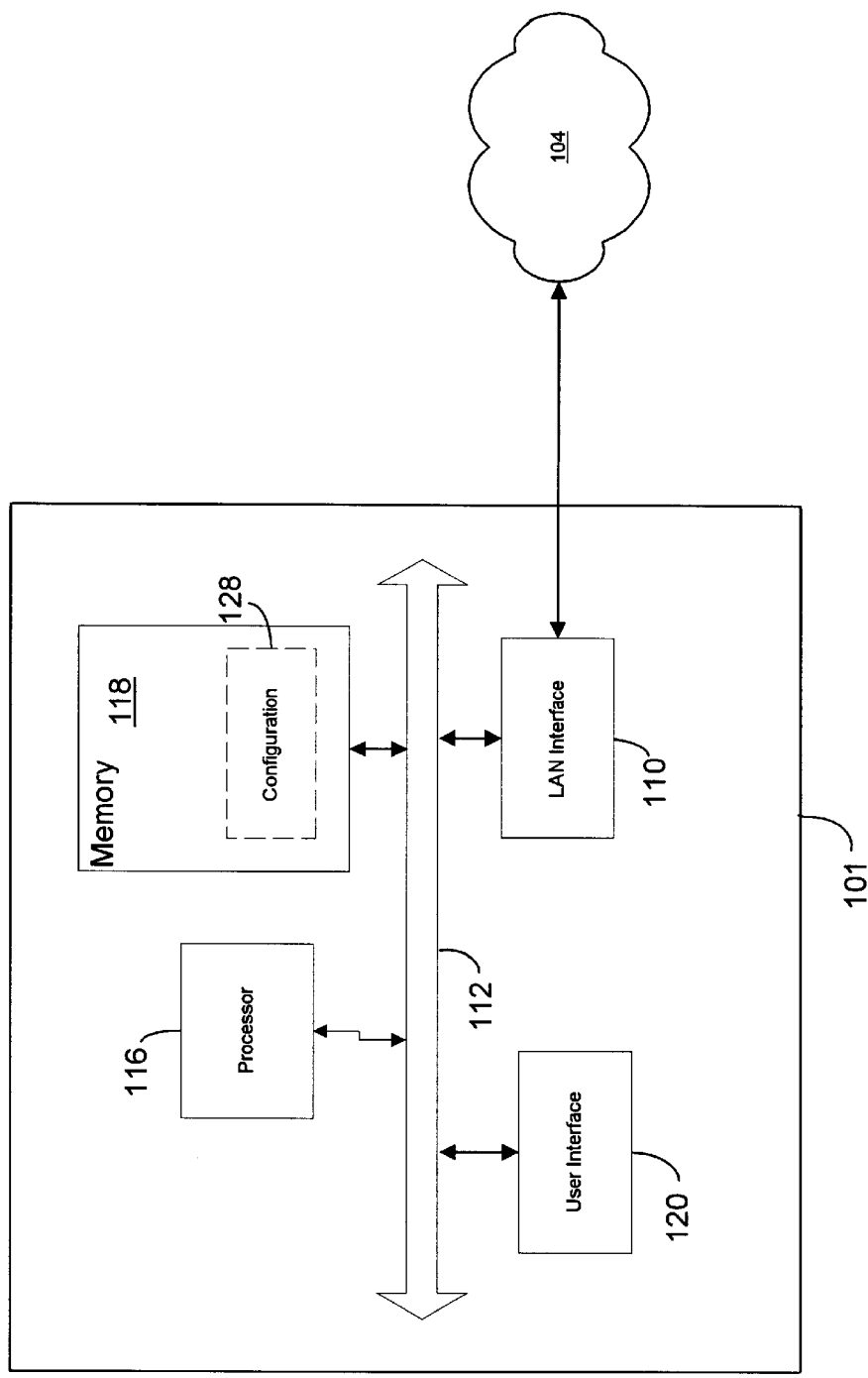
FIG. 2 is a schematic diagram of the computer.

FIG. 2 is a schematic diagram of the computer 101. As shown, the computer 101 includes a processor 116, a memory 118, a user interface 120 and a network interface 110 all connected via a local interface 112. The user interface 120 represents a display device and some sort of input device, such as a keyboard or pointer device or both. The local interface 112 may include, for example, one or more data buses with accompanying control buses. The network interface 110 links the local interface 112 to the network 104 and facilitates communications between the other devices linked to the network 104. The processor 116 is used to execute software programs stored in the memory 118.

Importantly, stored in the memory 118 is a configuration program 128. This program is initiated by the user to configure the computer 101 to use the target device.

Figure 3:
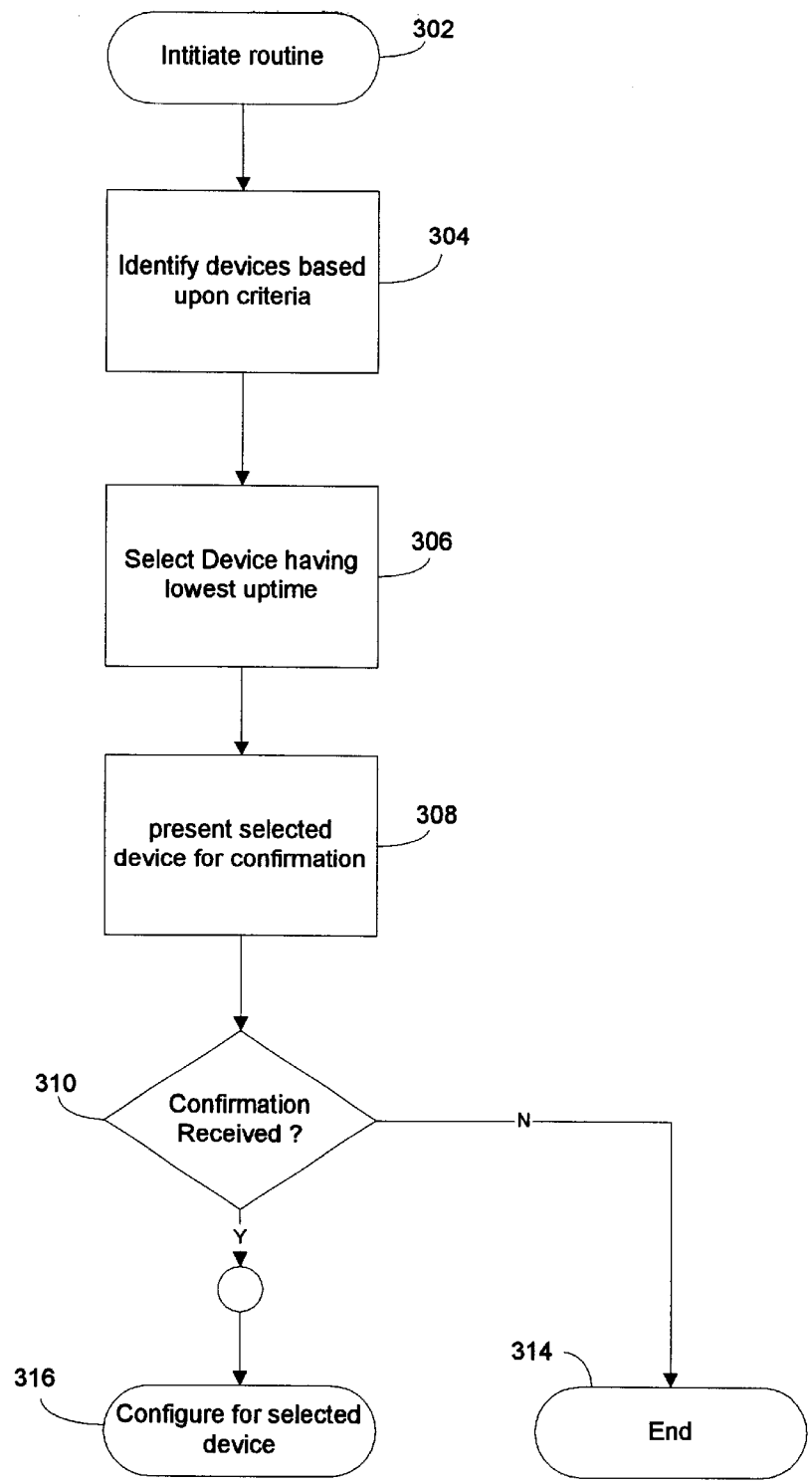
FIG. 3 is a flow diagram to illustrate generally the logic followed by the computer.

FIG. 3 is a flow diagram to illustrate generally the logic followed by the computer 101 under the direction of the configuration program 128. Upon initiating the program 128 (starting step 302), the computer 101 identifies each device connected to the network that meet certain pre-determined criteria (step 304).

For example, the configuration program may be used to configure the computer 101 to use a particular storage device. In that case, a single criterion could be used. That is, the device must be a storage device. Alternatively, two criteria could be used. First, the device must be a storage device. Second, the computer 101 must not be presently configured to use the device.

For illustration purposes, it is assumed that upon performing step 304, the three devices shown in FIG. 1 are identified. Thus, the computer 101 identifies the first device 150, the second device 152 and the third device 154. Next, the computer 101 selects the device from this group that has the lowest "uptime" (step 306). As will be discussed in detail below, this device is assumed to be the target device.

It is noted that the term "uptime" refers to how long the device has been operational since the last time the device was turned on. Typically, turning off a device and then turning the device back on again results in re-setting the uptime of the device. It is well known that many networked devices log their own uptime and that this value is often obtainable over the network by using prior art techniques.

As just mentioned, the device selected in step 306 is assumed to be the target device. To understand why this assumption is often correct, one needs to consider that a user often wishes to configure their computer to use a device that has recently been connected to a network. For example, a user will often wish to configure their computer to use a particular printer shortly after the printer has been installed in an area that is accessible to the user. It can be seen that in such a situation the newly installed printer will have a low uptime and will often have the lowest uptime of any other printer connected to the network.

Of course there are situations wherein the user will wish to configure their computer to use a device that does not have a low uptime. In these situations, the user can be instructed to power cycle the target device just prior to executing the configuration program 128. This would serve to re-set the uptime of the target device and make it likely that the computer 101 would select the device upon performing step 306.

Referring again to FIG. 3, after the device having the lowest uptime is selected, the computer 101 provides the user with information that can be used to physically identify the device (such as the device model name). In addition, the user is requested to confirm the selection (step 308).

Figure 4:
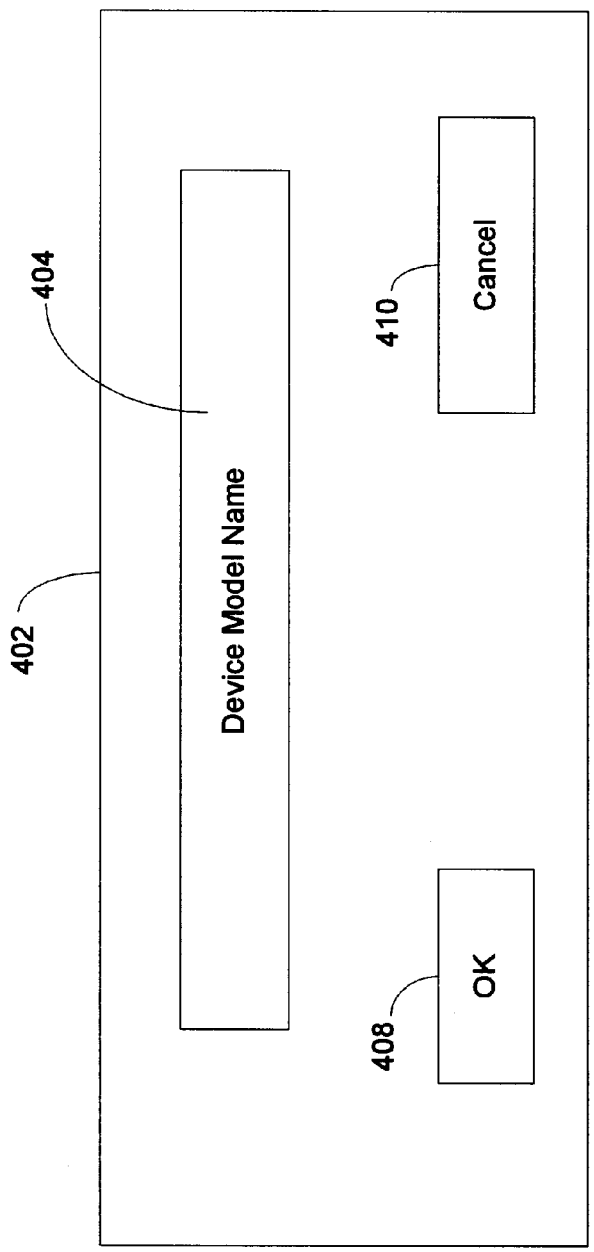
FIG. 4 illustrates one example of a dialog box that may be displayed by the computer.

One way to perform this step is for the computer 101 to display a dialog box. FIG. 4 illustrates one example of a dialog box 402 that could displayed. As shown in FIG. 4, the dialog box 402 includes a name field 404, an "OK" button 408 and a "cancel" button 410. The name field 404 displays the model name of the selected device. Often the model name will be known by the user or prominently displayed on the device itself. Therefore, this information provides the user at least some indication as to the device selected.

If confirmation is received (e.g., if the user selects the "OK" button 408) (decision step 310) then the computer 101 stores the network address of the selected device in an appropriate manner and proceeds to perform any additional steps required to configure itself to use the selected device. This may require additional input from the user. Importantly, however, the user is not required to provide the computer 101 with the network address of the selected device.

Figure 5:
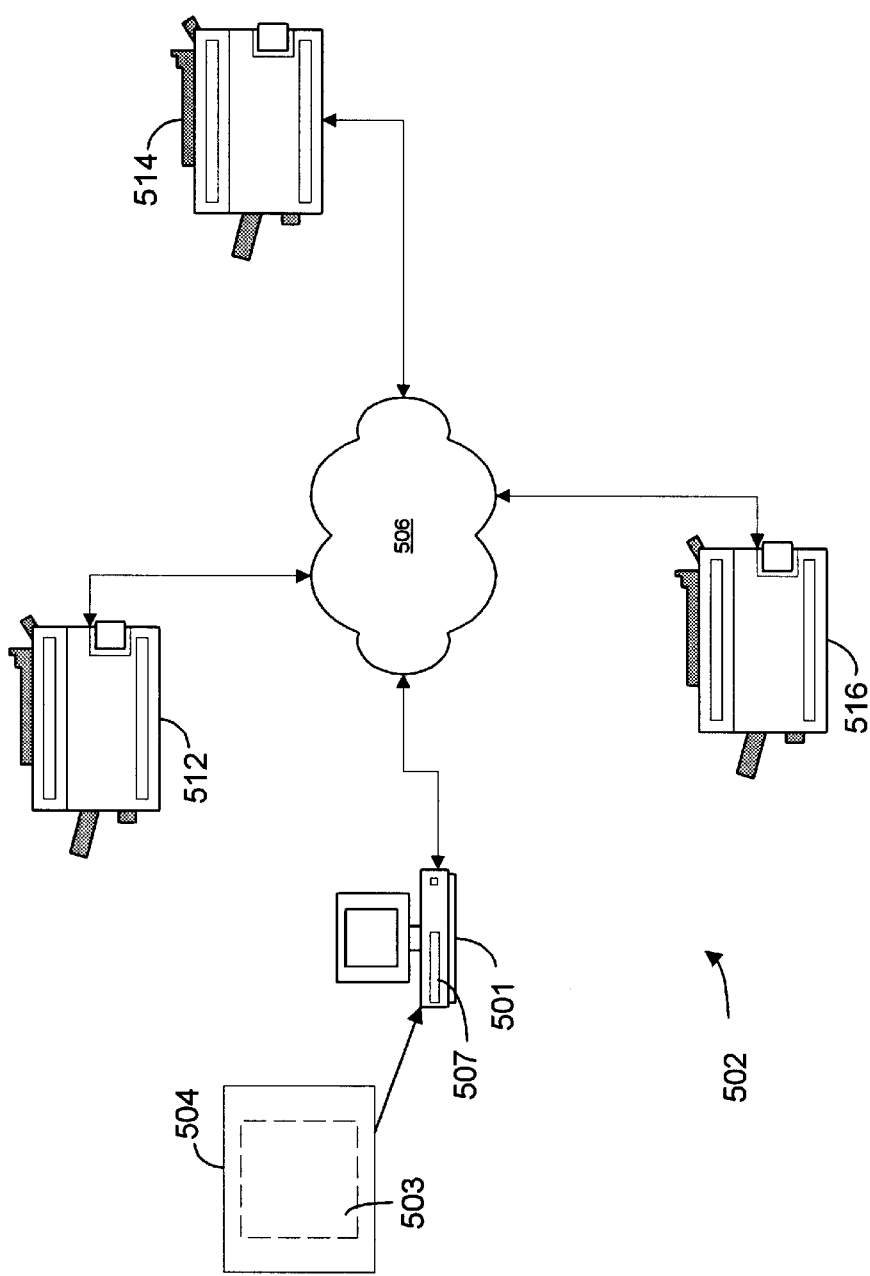
FIG. 5 is a block diagram of a second networking system that includes a second computer that is in accordance another embodiment of the present invention.

One important use of the present invention is to simplify the configuration process of a computer to print to a target printer over a network. To illustrate this aspect of the invention, a second exemplary embodiment of the invention is illustrated in FIG. 5 in the form of a personal computer 501. As shown, the computer 501 is part of a networking system 502 and is connected to a network 506.

Importantly, in order for a user to configure the computer 501 to print to a particular printer the user executes a second configuration program 503. As indicated, the program in this case may be read from a computer disk 504 which is installed in a local disk drive 507 of the computer 501.

Figure 6:
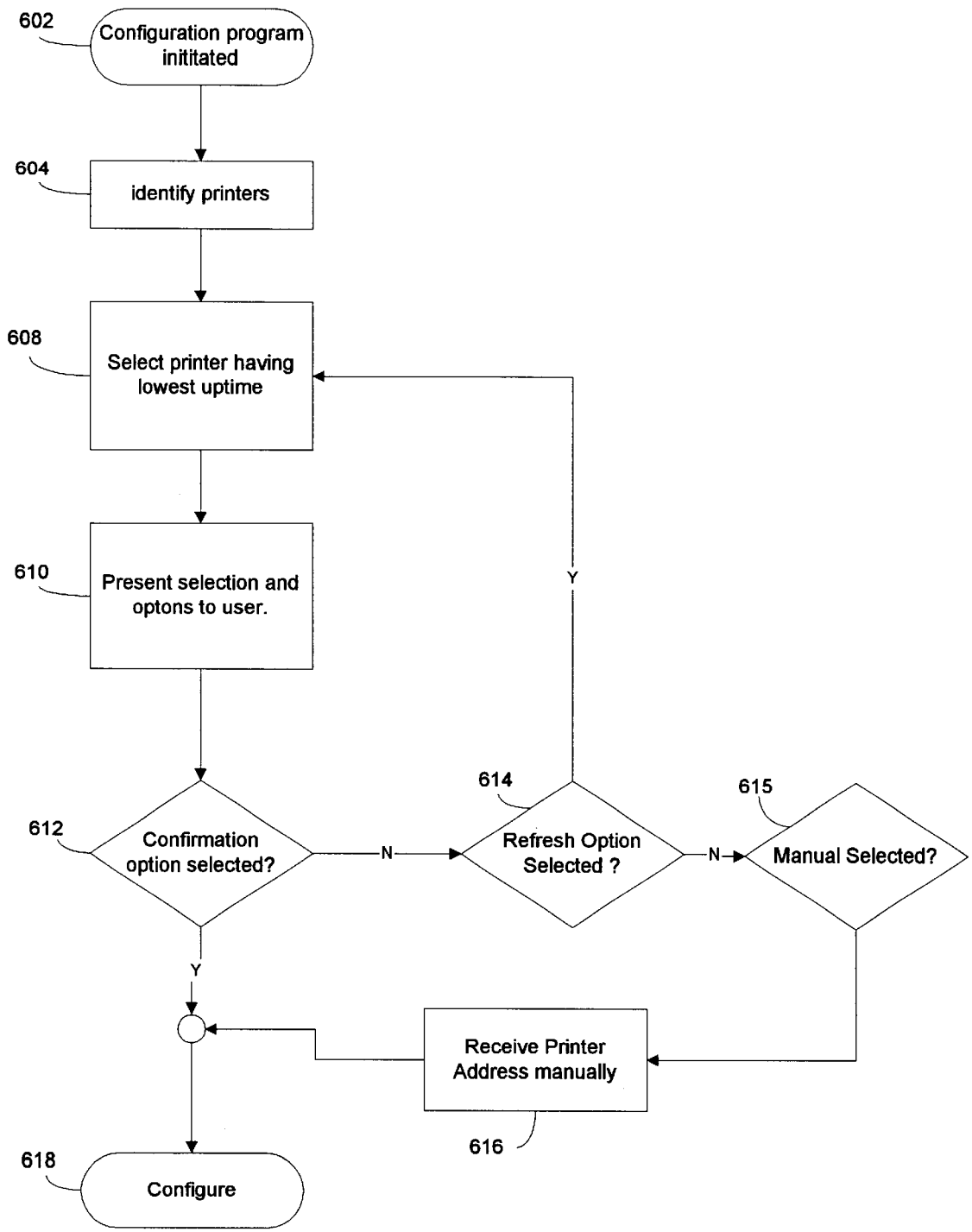
FIG. 6 is a flow diagram to illustrate generally the logic followed by the second computer.

FIG. 6 is a flow diagram to illustrate generally the logic followed by the computer 501 under the direction of this program. Upon the program being initiated (step 602), the computer 501 operates to identify each device connected to the network that meets the following criteria (step 604). First, the device must be a printer. Second, the computer 501 must not presently be configured to use the device. Alternatively, a single criterion could be used. That is, the device must be a printer.

For illustration purposes, it is assumed that a first printer 512, a second printer 514 and a third printer 516 are the only printers that meet the criteria used to perform the step 604. Therefore, these three printers are identified by the computer 501.

Next, the computer 501 selects the printer from the group of printers identified in step 604 that has the lowest uptime (step 608). The computer 501 then provides the user with information that indicates the printer selected as well as certain options that the user can choose. (step 610). This step may be accomplished by displaying a dialog box.

Figure 7:
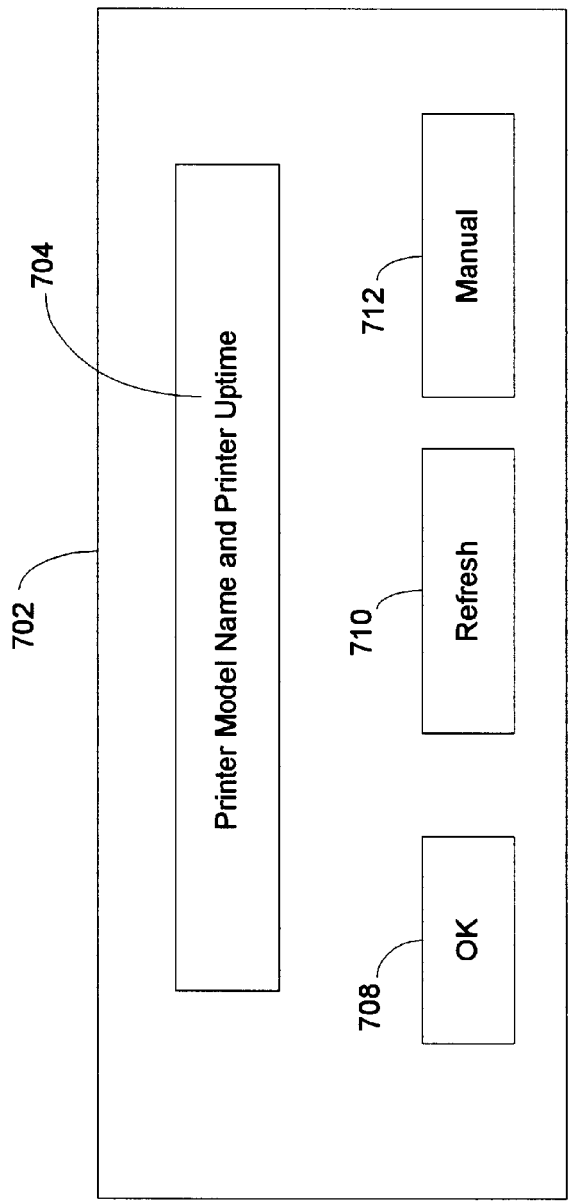
FIG. 7 illustrates one example of a dialog box that may be displayed by the second computer.

FIG. 7 illustrates one example of a dialog box 702 that could be displayed as well as the options that could be presented to the user. As shown, the dialog box 602 includes a name field 704, an "OK" button 708, a "refresh button" 710 and a "manual" button 712.

The field 704 displays the model name as well as the uptime of the selected printer. The model name of a printer is often displayed on the outside surface of the printer. Thus, this information provides the user with some indication that can easily be verified that the correct printer has been selected. As an alternative to or in addition to displaying the model name of the selected printer, the computer 501 could also cause the selected printer to print a test page. This would indicate to the user that the target printer had indeed been selected.

Referring again to FIG. 6, if confirmation is received (e.g., if the OK button 708 is selected) (decision step 612) the computer 501 proceeds to configure itself in an appropriate manner to use the selected printer for printing (step 618).

This may involve the installation of certain printing software and the setting of certain parameters. Importantly, the computer 501 also stores the network address of the selected printer in an appropriate manner.

If the user selects the refresh button 710 (decision step 614), the computer 501 re-performs the steps 608 and 610. Thus, the user could power cycle the target printer prior to selecting this option. This would result in re-setting the uptime of target printer and make it more likely that the target printer will be selected.

If the user selects the manual button 712 (decision step 615) the computer 501 provides the user with a prior art means for entering the network address of the target printer. Thus, for example, the user may be provided with a second dialog box that allows him to enter the network address of the target printer directly. Upon receiving the address information in this manner (step 616), the computer 501 proceeds to configure itself in an appropriate manner (step 618).

It can be seen that the printer selected upon performing (or re-performing) step 608 will often be the user's target printer for similar reasons previously discussed. For example, a user will often wish to configure their computer to print to a printer that has been newly installed in their area. That printer will also likely have a low uptime. In alternative situations, the user can simply power cycle the target printer either immediately prior to executing the configuration program or prior to selecting the "refresh button". This will re-set the uptime of the target printer and make it more likely that the target printer will be selected. It is noted that in alternative embodiments, step 608 may be performed by selecting a group of printers based upon uptime. For example, the three printers having the lowest uptime could be selected from the printers identified in step 604. This selected group of printers, along with the uptime of each printer, may then be presented (sorted by uptime) to the user, via a dialog box. The user can then choose either one of the printers in the group to configure the computer to use.

From the foregoing it will be appreciated that the computer provided by the invention is configurable by a user to print to the target printer without the user having to necessarily know the network address of the target printer. This saves the user having to perform the unproductive steps associated with the prior art such as having to interface with the printer controls to cause the target printer to print a test page with the network address printed thereon. Thus the present invention can be used to significantly simplify the configuration task for the user.

It is emphasized that the dialog boxes illustrated in FIG. 4 and FIG. 7 are only examples of how the information and the user selectable options can be presented to the user. There are many techniques known in the art that can be used to present information and selectable options to the user and the present invention is not limited to any one of these techniques.

It is also noted that in the embodiments described above, the functionality provided by the configuration program may in actuality be provided by more than one program. Alternatively, the functionality may be provided, in whole or in part, by hardware components. For example, one or more steps illustrated in FIG. 3 or FIG. 6 could be performed by operation of an application specific integrated circuit (ASIC), a programmable gate array (PGA) or a field programmable gate array (FPGA) or by some combination thereof.

The present invention may also be embodied as a program storage medium having computer readable program code embodied therein for causing a computer to perform one or more of the steps depicted in FIG. 3 or FIG. 6. Examples of such a storage medium include the memory 118 and the computer disk 504. In the context of this document, "program storage medium" can be any means that contain, store, propagate or otherwise transport the program for use by or in connection with an instruction execution system, apparatus or device. The program storage medium can be, for example (the following is a non-exhaustive list), a magnetic, optical, or semi-conductor based storage device.

While various embodiments of the present invention have been described above, it should be understood that they have been presented by way of example only, and are not intended to be limiting. Thus, the breath and scope of the present invention should not be limited by any of the above described exemplary embodiments, but should be defined only in accordance with the following claims and their equivalents.

What is claimed is:

1. In a networked system including a computer and a plurality of devices coupled to the computer over a network, a computerized method for selecting a device from the plurality of devices, comprising the steps of:

(a) evaluating the uptime of each one of the devices to identify the device from the plurality of devices that has the lowest uptime;

(b) selecting the identified device; and (c) configuring the computer to use the selected device.

2. The computerized method of claim 1, wherein each of the plurality of devices is a printer.

3. The computerized method of claim 2, further comprising the steps of:

(b) configuring the computer to use the selected printer.

4. The computerized method of claim 1, further comprising:

(b) requesting confirmation that the computer should be configured to use the selected device; and (c) if the confirmation is received, then configuring the computer to use the selected device.

5. The computerized method of claim 2, further comprising:

(b) requesting confirmation that the computer should be configured to use the selected printer; and (c) if the confirmation is received, then configuring the computer to use the selected printer.

6. A computer comprising:

(a) means for identifying a plurality of devices coupled to a network;

(b) means for selecting a device that has the lowest uptime from the plurality of devices;

(c) means for configuring the computer to use the device; and (d) wherein the selecting means operates to evaluate the uptime of each one of the devices in order to identify the device that has the lowest uptime.

7. The computer of claim 6, further comprising:

(c) means for requesting confirmation from a user that the computer should be configured to use the selected device.

8. The computer of claim 7, further comprising:

(d) means for receiving the confirmation and responding thereto by configuring the computer to use the selected device.

9. The computer of claim 6, wherein each of the plurality of devices is a printer.

10. The computer of claim 9, further comprising:
(c) means for configuring the computer to use the device in response to the device being selected.

11. The computer of claim 9, further comprising:
(c) means for requesting confirmation from a user that the computer should be configured to use the selected device.

12. The computer of claim 11, further comprising:
(d) means for receiving the confirmation and responding thereto by configuring the computer to use the selected device.

13. A program storage medium readable by a computer, tangibly embodying a program of instruction executable by the computer to perform method steps for selecting a device coupled to a network, the method steps comprising:
(a) identifying a plurality of devices coupled to the network that meet at least one pre-determined criterion:
(b) selecting a device, from the plurality of devices, having the lowest uptime; and
(c) configuring the computer to use the selected device.

14. The computer readable medium of claim 13, wherein the method steps further include the step of:
(d) requesting confirmation that the computer should be configured to use the selected device.

15. The computer readable medium of claim 14, wherein the method steps further include the steps of:
(e) upon receiving the confirmation, responding thereto by configuring the computer to use the selected device.

16. The computer readable medium of claim 13, wherein the pre-determined criteria include the criterion that the device is a printer.

17. The computer readable medium of claim 15, wherein the pre-determined criteria include the device is a printer and the computer is not presently configure to use the device.

* * * * *